United States Patent [19]

Seidel

[11] B 3,914,554

[45] Oct. 21, 1975

[54] COMMUNICATION SYSTEM EMPLOYING SPECTRUM FOLDING

[75] Inventor: Harold Seidel, Warren, N.J.

[73] Assignee: Bell Telephone Laboratories, Incorporated, Murray Hill, N.J.

[22] Filed: May 18, 1973

[21] Appl. No.: 361,569

[44] Published under the Trial Voluntary Protest Program on January 28, 1975 as document no. B 361,569.

[52] U.S. Cl. ...................... 179/15.55 R; 179/15 BW

[51] Int. Cl.[2] ........................................... H04B 1/66

[58] Field of Search ...... 179/15.55 R, 15 A, 15 BW; 325/137

[56] References Cited

UNITED STATES PATENTS

| | | | |
|---|---|---|---|
| 1,773,126 | 8/1930 | Affel | 179/15.55 R |
| 1,948,973 | 2/1934 | Steinberg | 179/15.55 R |
| 2,014,081 | 9/1935 | Cserely | 179/15 BW |
| 3,030,450 | 4/1962 | Schroeder | 179/15.55 R |
| 3,069,506 | 12/1962 | Hopner | 179/15.55 R |
| 3,246,084 | 4/1966 | Kryter | 179/15.55 R |

*Primary Examiner*—Ralph D. Blakeslee
*Attorney, Agent, or Firm*—S. Sherman

[57] ABSTRACT

This application discloses an arrangement for transmitting, over an existing communication facility, a signal whose spectrum only partially overlaps the passband of the facility. This is accomplished by a technique called "spectrum folding" wherein the input signal spectrum is divided into two subbands, one of which includes the out-of-band frequency components, and the other of which includes only those frequency components that fall within the system passband. The former subband is then frequency-shifted to a portion of the passband not occupied by the in-band subband, following which the two subbands are multiplexed for transmission along a common wavepath. At the receiver, the subbands are again separated, and the frequency-shifted subband translated back to its original position in the spectrum. The subbands are then combined to reproduce the original input signal.

7 Claims, 5 Drawing Figures

COMMUNICATION SYSTEM EMPLOYING SPECTRUM FOLDING

This invention relates to arrangements for transmitting, over a given communication system, a signal whose frequency spectrum only partially overlaps the passband of the system.

BACKGROUND OF THE INVENTION

As new services are introduced over existing communication facilities, it sometimes occurs that the frequency spectrum of the signal to be transmitted does not fall wholly within the passband of the particular facility. Thus, while the facility bandwidth may be larger than the signal bandwidth, the two only partially overlap. An illustration of this is the attempt to transmit data pulses whose spectrum extends from dc to about 2,000 hertz over ordinary telephone wire pairs whose useful bandwidth extends between 400 to 4,000 hertz. Clearly, in order to do this, means must be provided for adapting the facility to handle that portion of the signal spectrum between dc and 400 hertz.

SUMMARY OF THE INVENTION

To transmit a signal having a frequency spectrum $f_1$–$f_3$ over a transmission system having a passband $f_2$–$f_4$, where $f_1 < f_2 < f_3 < f_4$, means are provided at the transmitter for dividing the signal spectrum into two sidebands $f_1$–$f'_2$ and $f'_2$–$f_3$, where $f'_2 \geq f_2$. Since the first subband $f_1$–$f'_2$ falls primarily outside the passband of the wavepath, frequency translating means are provided for shifting this portion of the signal spectrum to a region of the spectrum $f'_3$–$f'_4$ between the upper end $f_3$ of the second subband and the high end $f_4$ of the passband. With the second subband and the frequency-shifted subband now wholly within the passband of the system, the two signal components are multiplexed for transmission along a common wavepath.

At the receiver, the two subbands are demultiplexed, and the frequency-shifted subband $f'_3$–$f'_4$, retranslated back to its initial frequency range $f_1$–$f'_2$. The two subbands $f_1$–$f'_2$ and $f'_2$–$f_3$ are then combined to reproduce the original signal spectrum $f_1$–$f_3$.

To ensure phase coherency among the signal frequency components, phase equalizers are included as required.

It is an advantage of the above-described technique, termed "spectrum folding," that only the portion of the signal that falls outside the passband of the transmission system is operated upon.

DETAILED DESCRIPTION

Figure 1:
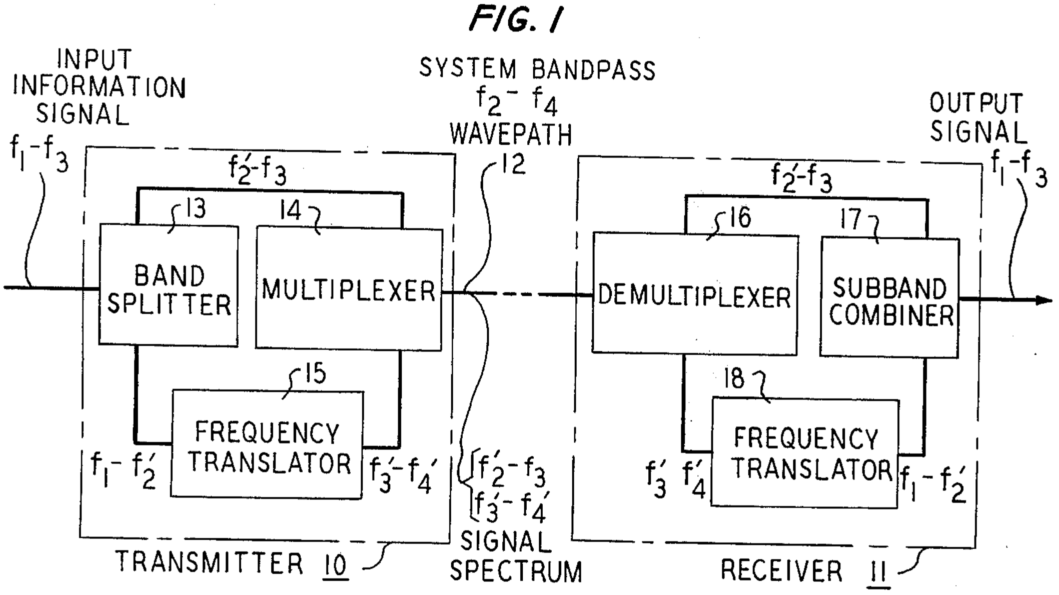
FIG. 1 shows, in block diagram, an arrangement for transmitting, over a given communication system, a signal whose frequency spectrum only partially overlaps the passband of the system.

Referring to the drawings, FIG. 1 shows, in block diagram, a communication system comprising: a transmitter 10; a receiver 11; and a wavepath 12, including therealong repeaters, substations, etc., (not shown) connecting the transmitter to the receiver. In particular, the system is characterized by a passband that extends between a lower frequency $f_2$, and a higher frequency $f_4$, as illustrated by curve 20 in FIG. 2, where $f_2$ and $f_4$ are the 3 db points of curve 20.

Figure 2:
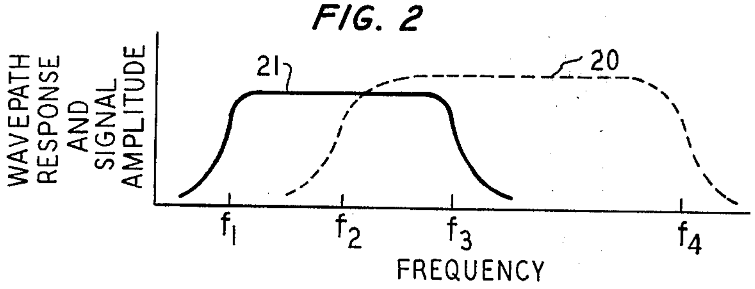
FIGS. 2, 3 and 4, included for purposes of explanation, show graphically, the signal spectrum, and the two signal subbands relative to the system passband at various points in the system.

The problem to which the present invention addresses itself is how to adapt this system so as to transmit therealong a signal whose spectrum extends between a lower frequency $f_1$ and an upper frequency $f_3$, as illustrated by curve 21 in FIG. 2, where $f_1 < f_2 < f_3 < f_4$, and the signal bandwidth $\Delta f_s = f_3 - f_1$, is equal to or less than the system bandwidth $\Delta f_w = f_4 - f_2$.

In accordance with the present invention, the transmitter is modified to include means for dividing the signal spectrum into two subbands, one of which includes all of the out-of-band frequency components and the other of which includes only in-band frequency components. The latter subband is left intact, whereas the former subband is frequency-shifted to an unoccupied portion of the system passband for transmission therealong. Accordingly, transmitter 10 includes a bandsplitter 13 to which the input information signal is applied. For purposes of identification, the signals hereinafter will be identified by their frequency spectrums. In accordance with this convention, the input signal to bandsplitter 13 is $f_1$–$f_3$.

Figure 3:
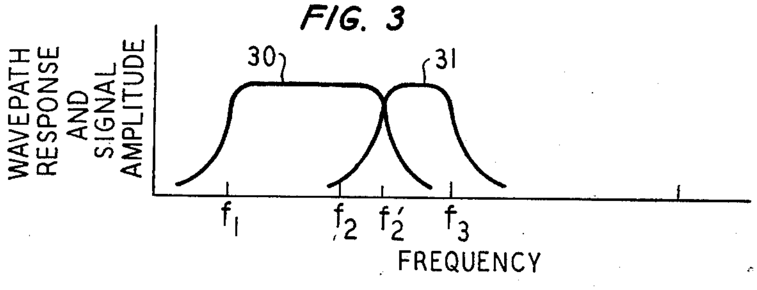
Figure 4:
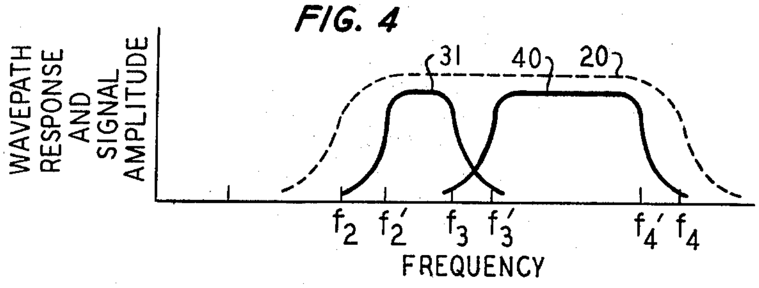

The bandsplitter divides signal $f_1$–$f_3$ into two subbands $f_1$–$f'_2$ and $f'_2$–$f_3$, where $f_2 \leq f'_2 < f_3$. As such, subband $f_1$–$f'_2$, illustrated by curve 30 in FIG. 3, includes all of the out-of-band signal frequency components, and subband $f'_2$–$f_3$, illustrated by curve 31 in FIG. 3, includes only in-band components. The latter is coupled to a multiplexer 14 intact. The out-of-band signal is coupled to a frequency translator 15 which shifts the frequencies of this subband from $f_1$–$f'_2$ to $f'_3$–$f'_4$ where $f'_3 > f_3$ and $f'_4 < f_4$. This places this portion of the signal within the passband of the system, as illustrated in FIG. 4, which shows the system passband $f_2$–$f_4$, represented by curve 20, the in-band subband $f'_2$–$f_3$, curve 30, and the frequency-shifted subband $f'_3$–$f'_4$, curve 40.

The output from translator 15 is then coupled to multiplexer 14 wherein signals $f'_2$–$f_3$, and $f'_3$–$f'_4$ are combined for transmission along wavepath 12. While amplifiers, filters and other circuit components would typically be included in transmitter 10, in accordance with sound engineering practices, such components have been omitted from FIG. 1 in order to simplify the diagram. Only those components necessary for an understanding of the invention are shown.

At the outputs end of wavepath 12, receiver 11 is modified to include a demultiplexer for separating the two subbands. The in-band subband $f'_2$–$f_3$ is coupled, intact, to a subband combiner 17. The frequency-shifted subband $f'_3$–$f_4$ is coupled to a frequency translator 18 which translates the signal frequency components back to their original position $f_1$–$f'_2$ in the signal spectrum. Following translation, signal $f_1$–$f'_2$ is coupled to subband combiner 17 wherein the input signal $f_1$–$f_3$ is regenerated. While not shown, amplifiers, filters and other circuit components would also be included in the modified receiver as required.

The specific form taken by the various circuit components identified in FIG. 1 will depend upon the particular frequencies involved. Obviously, a bandsplitter at the higher microwave frequencies will differ in detail from a bandsplitter at audio frequencies.

Figure 5:
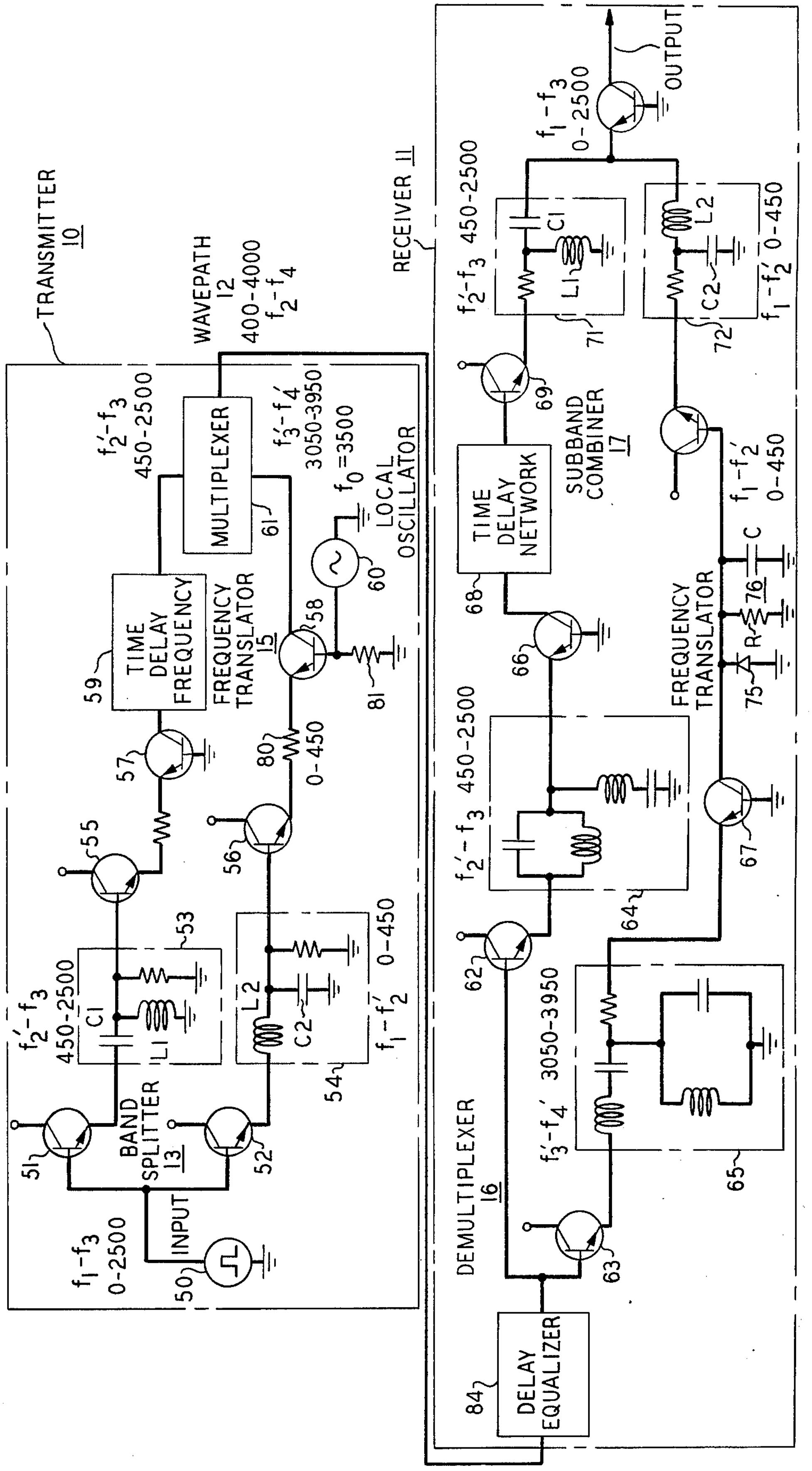
FIG. 5 shows a specific embodiment of the invention for use at audio frequencies.

For purposes of illustration, FIG. 5 shows the relevant portions of a transmitter and a receiver adapted to transmit and receive data set baseband signals, whose spectrum extends from direct current to about 2,500 hertz, over an existing telephone facility whose passband extends from about 400 to 4,000 hertz.

At the transmitter 10, an input signal, derived from a signal source 50, is simultaneously applied to the base electrodes of transistors 51 and 52, comprising elements of bandsplitter 13. The transistors are connected in the common collector configuration, with the emitter electrode of transistor 51 coupled to a high-pass filter 53, and the emitter electrode of transistor 52 coupled to a low-pass filter 54.

Assuming, for example, an input signal spectrum $f_1$–$f_3$ of 0–2,500 hertz, and an $f'_2$ of 450 hertz, filters 53 and 54 are designed such that the two subbands $f_1$–$f'_2$ and $f'_2$–$f_3$ from bandsplitter 13 are, respectively, 0–450 and 450–2,500. Since the latter subband is wholly within the system passband of 400–4,000 hertz, it is coupled intact through transistor stages 55 and 57, and delay network 59 to multiplexer 14. The reason for the inclusion of a delay network 59 will be considered in greater detail hereinbelow.

Subband 0–450, on the other hand, is mostly outside the system passband and, hence, is coupled by means of a transistor stage 56 to frequency translator 15. In the illustrative embodiment, translator 15 is an amplitude modulator stage wherein subband 0–450 serves to amplitude modulate a local oscillator carrier signal. Specifically, translator 15 comprises a transistor 58 whose emitter is coupled through a series resistor 80 to the emitter of a driver stage 56, and whose base is connected to ground through a series resistor 81, and to a local oscillator 60. In operation, the magnitude of the local oscillator signal current produced in the collector of transistor 58 varies as a function of the amplitude of the subband signal current coupled to its emitter. The resulting output signal current, accordingly, includes the local oscillator signal at frequency $f_o$, and sidebands which extend an amount $\pm f'_2$ on either side of $f_o$. In the instant case, $f_o = 3{,}500$ hertz and hence, the output signal from frequency translator 15 extends between 3,050 and 3,950 hertz (i.e., 3,500 ± 450). As will be noted, the lower frequency of this signal is 550 hertz above the upper frequency of subband 450–2,500, while the upper frequency of the frequency shifted subband is less than the upper frequency, 4,000 hertz, of the system passband. As such, the frequency shifted subband falls within the unoccupied portion of the system passband with a 550 hertz guardband between the two subbands. The latter are then multiplexed for transmission along wavepath 12 by connecting the collectors of transistors 57 and 58 to a common junction 61 which, in turn, is connected to wavepath 12.

At the receiver, the incoming signal is passed through a delay equalizer 84, and then simultaneously applied to the bases of transistors 62 and 63 of demultiplexer 16. The transistors, which are connected in the common collector configuration, are provided with filters in their emitter circuits for separating the two subbands. As illustrated, the emitter of transistor 62 is connected to a filter 64 which has a passband region for passing subband $f'_2$–$f_3$, and a band-reject region which extends over the interval occupied by subband $f'_3$–$f'_4$. The emitter of transistor 63 is connected to a filter 65 which has a bandpass region for passing subband $f'_3$–$f'_4$, and a band-reject region which extends over the interval occupied by subband $f'_2$–$f_3$.

After the subbands are separated, subband $f'_3$–$f'_4$ is coupled to frequency translator 18 which, in this illustrative embodiment, is an amplitude detector which includes: a transistor 67 connected in the common base configuration, and a diode 75, connected in shunt with the collector of transistor 67 and with an R–C load 76. The detector recovers the modulating signal $f_1$–$f'_2$ that was previously used to amplitude modulate the 3,500 hertz local oscillator signal at the receiver. The effect is to translate the frequency-shifted subband back to its original position in the spectrum relative to the other subband 450–2,500, which has passed through a transistor 66, connected in the common base configuration, and a delay network 68 which, as will be explained in greater detail hereinbelow, serves to equalize the time delay experienced by the two subbands as they traverse different wavepaths.

Having been restored to its proper position in the spectrum, subband 0–450 is coupled through a common collector stage transistor 70 and a low-pass filter to subband combiner 17. Similarly, subband 450–2,500 is coupled through a common collector transistor stage 69 and a high-pass filter 71 to subband combiner 17. The latter, as illustrated, comprises a common base transistor stage 73. The two subbands are coupled to the emitter electrode of the transistor wherein they are combined to reconstitute the input signal $f_1$–$f_3$. The latter is, in turn, extracted from the transistor collector electrode.

As in any transmission system, the fidelity with which the input signal is reproduced at the output depends upon the delay distortion in the system. Typically, such distortion is minimized by the inclusion of a delay equalizer at the output end of the system and, indeed, this procedure can be followed in the illustrative embodiment. Alternatively, the system can be designed such that the delay distortion is minimized at selected intervals along the system, thus reducing the magnitude of the delay compensation required at the output end of the system. This latter procedure has been followed in the illustrative embodiment by the particular selection of filters and by the inclusion of delay networks at selected locations. For example, any variety of filters can be employed in bandsplitter 13. Advantageously, filters are selected which have the same frequency-phase characteristics. To illustrate, the output functions $E_1(\omega)$ and $E_2(\omega)$ of the particular filters 53 and 54 shown are given by $$E_1(\omega) = (-\omega^2 L_1 C_1)/[1 + (i\omega) L_1 + (i\omega)^2 L_1 C_1]$$

and $$E_2(\omega 1 = 1/[1 + (i\omega) L_2 + (i\omega)^2 L_2 C_2].$$

As will be noted, when $L_1 = L_2$ and $C_1 = C_2$, the frequency-phase characteristics, as given by the denominator of these two functions, are identical to within a constant 180° due to the minus sign associated with the numerator of $E_1(\omega)$. This means that in the overlap region about 450 hertz, where the two subbands share frequency components in common, the time delays through the two filters are the same. Any deviations from a linear phase characteristic over the rest of the spectrum occupied by the two subbands is compensated for by the complementary filters 71 and 72, located at the input to subband combiner 17.

Recognizing that the delay experienced by subband 0–450 as it passes through frequency translator 15 will be different than that experienced by subband 450–2,500, a compensating time delay network 59 is added to the upper subband wavepath.

Delay distortion in wavepath 12 is corrected by delay equalizer 84, located at the output end of the wavepath.

Filters 64 and 65 in demultiplexer 16 are illustrative of another pair of filters which have the same phase characteristic within a constant 180° difference. However, since the subbands in this portion of the system are separated by a guardband, there is no particular advantage in their use other than the fact that complementary type filters can then be used to compensate for any significant delay distortion that may have been produced thereby.

Following demultiplexer 16, a second time delay network 68 is included to equalize the time delay through frequency translator 18.

As indicated above, FIG. 5 merely illustrates one way of handling the problem of delay distortion. Obviously, other arrangements of equalizers and delay network can just as readily be used to achieve the same result.

It should be noted that while the illustrative embodiment shows the out-of-band portion of the signal spectrum extending below the system passband, the principles of the invention can just as readily be applied to the case wherein the signal spectrum overlaps the upper end of the system passband, and the out-of-band portion extends above the system passband. In this latter case $f_4 < f_3 < f_2 < f_1$;

and $f_2 \geq f'_2 > f_3$.

The subband including the out-of-band signal frequencies is frequency-shifted down at the transmitter such that $f'_3 < f_3$;

and $f'_4 \geq f_4$;

and is then frequency-shifted back up at the receiver.

It will also be recognized that the specific circuit shown in FIG. 5 is merely illustrative. As indicated hereinabove, the circuit details in any case will depend upon the frequencies involved. For example, at the higher frequencies a bandsplitter and band recombiner of the type shown in my U.S. Pat. No. 3,426,292, issued Feb. 4, 1969, can be used. Similarly, other types of frequency translators can be employed at the transmitter, such as, for example, single sideband amplitude modulators, phase modulators, frequency modulators, and parametric converters. This, in turn, will determine the type of frequency translator used at the receiver end of the system. Thus, in all cases it is understood that the above-described arrangements are illustrative of a small number of the many possible specific embodiments which can represent application of the principles of the invention. Numerous and varied other arrangements can readily be devised in accordance with these principles by those skilled in the art without departing from the spirit and scope of the invention.

I claim:

1. In a communication system including a transmitter, a receiver, and a wavepath connecting said transmitter to said receiver:

means for transmitting and receiving an input signal having a frequency spectrum $f_1$–$f_3$ which only partially overlaps the passband $f_2$–$f_4$ of said system, and which is less than said passband;

said means comprising at said transmitter:

a bandsplitter for dividing said signal into two subbands $f_1$–$f'_2$ and $f'_2$–$f_3$, where the first of said subbands includes that portion of the signal spectrum that falls outside said passband, and where the second of said subbands falls wholly within said passband;

a frequency translator for shifting the frequencies of said first subband to a region $f'_3$–$f'_4$ of said passband not occupied by said second subband;

and a multiplexer for combining said second subband $f'_2$–$f_3$ and said frequency-shifted first subband $f'_3$–$f'_4$ for transmission along said wavepath;

and where said means comprises at said receiver:

a demultiplexer for separating said second subband $f'_2$–$f_3$ and said frequency-shifted first subband $f'_3$–$f'_4$;

a second frequency translator for shifting the frequencies of said frequency-shifted subband $f'_3$–$f'_4$ back to $f_1$–$f'_2$;

and means for recombining said first and said second subbands $f_1$–$f'_2$ and $f'_2$–$f_3$ to reform said input signal spectrum $f_1$–$f_3$.

2. The system according to claim 1 wherein:

$f_1 < f_2 < f_3 < f_4$;

$f_2 \leq f'_2 < f_3$;

$f'_3 > f_3$;

and $f'_4 \leq f_4$.

3. The system according to claim 1 wherein:

$f_4 < f_3 < f_2 < f_1$;

$f_2 \geq f'_2 > f_3$;

$f'_3 < f_3$;

and $f'_4 \geq f_4$.

4. The system according to claim 1 including phase equalization means connected to said receiver for reducing delay distortion in said system.

5. The system according to claim 1 wherein:

said first frequency translator is a modulator;

and said second frequency translator is a modulation detector.

6. The system according to claim 2 wherein:

said signal is a baseband signal for which $f_1 = 0$.

7. The system according to claim 1 wherein:

said first translator is an amplitude modulator;

and wherein said second frequency translator is an amplitude detector.

* * * * *